(12) United States Patent
Feng

(10) Patent No.: US 11,877,251 B2
(45) Date of Patent: Jan. 16, 2024

(54) TIME SYNCHRONIZATION METHOD, ELECTRONIC DEVICE AND STORAGE MEDIUM

(71) Applicant: SHENZHEN AI-LINK CO., LTD., Guangdong (CN)

(72) Inventor: Jiangping Feng, Guangdong (CN)

(73) Assignee: SHENZHEN AI-LINK CO., LTD., Guangdong (CN)

( * ) Notice: Subject to any disclaimer, the term of this patent is extended or adjusted under 35 U.S.C. 154(b) by 0 days.

(21) Appl. No.: 18/265,826

(22) PCT Filed: Mar. 25, 2022

(86) PCT No.: PCT/CN2022/083182
§ 371 (c)(1),
(2) Date: Jun. 7, 2023

(87) PCT Pub. No.: WO2022/247432
PCT Pub. Date: Dec. 1, 2022

(65) Prior Publication Data
US 2023/0397137 A1 Dec. 7, 2023

(30) Foreign Application Priority Data
May 25, 2021 (CN) .......................... 202110568865.8

(51) Int. Cl.
*H04W 56/00* (2009.01)
*H04W 60/04* (2009.01)
*H04W 76/10* (2018.01)

(52) U.S. Cl.
CPC ....... *H04W 56/0015* (2013.01); *H04W 60/04* (2013.01); *H04W 76/10* (2018.02)

(58) Field of Classification Search
CPC .. H04W 56/0015; H04W 60/04; H04W 76/10
See application file for complete search history.

(56) References Cited

U.S. PATENT DOCUMENTS

2011/0185286 A1\* 7/2011 Moyers ............... H04L 12/1827
715/752
2020/0137675 A1\* 4/2020 Park .................... H04W 68/005
(Continued)

FOREIGN PATENT DOCUMENTS

| CN | 101388761 A | 3/2009 |
|---|---|---|
| CN | 102209307 A | 10/2011 |

(Continued)

OTHER PUBLICATIONS

Unknown, "KI#3B: Sol#7: Removal of EN in Solution #7" Oct. 12-23, 2020 Electronic meeting, 3GPP TSG SA2 Meeting #141E, NTT DOCOMO, Nokia, Nokia Shanghai Bell, Qualcomm, S2-2007202-Sol7_EN, 5 pages.

(Continued)

*Primary Examiner* — Ayanah S George
(74) *Attorney, Agent, or Firm* — Ziegler IP Law Group

(57) ABSTRACT

The present application relates to the technical field of communications, and provides a time synchronization method, an electronic device and a storage medium. A terminal sends a target protocol data unit (PDU) session establishment request to a session management function (SMF) according to a routing policy, wherein the target PDU session establishment request includes a target virtual private link identifier; and the terminal establishes a target PDU session with a target user plane function (UPF). The described method is applied to embodiments of the present application, so that a time synchronization message may be transmitted by means of the target PDU session and an interface indicated by target virtual private link information.

9 Claims, 7 Drawing Sheets

A terminal sends a session establishment request of a target protocol data unit PDU to a session management function SMF according to a routing policy, and the target PDU session establishment request includes a target virtual dedicated link identifier — S101

The terminal establishes a target PDU session with the target user plane function UPF to transmit a time synchronization message through the target PDU session and the interface indicated by the target virtual dedicated link information — S102

(56) References Cited

U.S. PATENT DOCUMENTS

| | | | |
|---|---|---|---|
| 2020/0305101 A1 | 9/2020 | Gage | |
| 2020/0351804 A1* | 11/2020 | Moon | H04W 56/001 |
| 2023/0239736 A1* | 7/2023 | Suh | H04W 76/22 |
| | | | 370/329 |

FOREIGN PATENT DOCUMENTS

| | | | |
|---|---|---|---|
| CN | 111200846 A | 5/2020 | |
| CN | 111490841 A | 8/2020 | |
| CN | 111492700 A | 8/2020 | |
| CN | 112087794 A | 12/2020 | |
| CN | 113038590 A | 6/2021 | |
| EP | 3641423 A1 * | 4/2020 | H04W 48/16 |
| WO | 2020111994 A1 | 6/2020 | |
| WO | WO-2020187309 A1 * | 9/2020 | H04B 1/713 |

OTHER PUBLICATIONS

The State Intellectual Property Office of People's Republic of China "Notification to Grant Patent Right for Invention" Application No. 202110568865.8, dated Jul. 22, 2021, 1 page, English Translation 2 pages.

The State Intellectual Property Office of People's Republic of China, First Office Action, Application No. 202110568865.8, dated Jul. 6, 2021, 3 pages, English Translation, 5 pages.

The State Intellectual Property Office of People's Republic of China, First Search, Application No. 2021105688658, dated Jun. 16, 2021, 2 pages.

The State Intellectual Property Office of People's Republic of China, Supplementary Search, Application No. 2021105688658, dated Jul. 20, 2021, 1 page.

China National Intellectual Property Administration, First Search of Priority Application, Application No. 2021105688658, dated May 25, 2021, 2 pages.

China National Intellectual Property Administration, Supplementary Search of Priority Application, Application No. 2021105688658, dated May 25, 2021, 1 page.

China National Intellectual Property Adminstration, International Search Report, Application No. PCT/CN2022/083182, dated Apr. 28, 2022, 4 pages, English Translation, 2 pages.

International Searching Authority, Written Opinion of the International Searching Authority, Application No. PCT/CN2022/083182, dated Apr. 28, 2022, 5 pages, English Translation, 5 pages.

* cited by examiner

TIME SYNCHRONIZATION METHOD, ELECTRONIC DEVICE AND STORAGE MEDIUM

CROSS-REFERENCE TO RELATED APPLICATION

The present disclosure claims the priority to the Chinese patent application with the filing No. 202110568865.8 filed with the Chinese Patent Office on May 25, 2021, and entitled "Time Synchronization Method, Electronic Device and Storage Medium", the contents of which are incorporated herein by reference in entirety.

TECHNICAL FIELD

The present disclosure relates to the technical field of communication, in particular to a time synchronization method, an electronic device and a storage medium.

BACKGROUND ART

The 5th generation mobile networks (5G technology) is the latest generation of cellular mobile communication technology, and it is also an extension of 4G (LTE-A, WiMax), 3G (UMTS, LTE) and 2G (GSM) systems. The performance goals of 5G are high data rate, reduced latency, energy saving, reduced costs, improved system capacity and large-scale device connectivity.

At present, when realizing time synchronization between clock nodes based on communication system, it is often necessary to take the communication system as a clock node and add some additional functions. For example, in the 5th generation (5G) communication system, it is necessary to enhance the user plane function (UPF) and the user equipment (UE) of the 5G core network, and support the IEEE 802.1AS or IEEE1588 protocols.

Therefore, the existing implementation methods are complex, which is not advantageous to the rapid deployment of a time sensitive networking TSN.

SUMMARY

Aiming at the shortcomings in the prior art, the objective of the present disclosure is to provide a time synchronization method, an electronic device and a storage medium, which are simple to implement, and are advantageous to the rapid deployment of a time sensitive networking TSN.

In order to achieve the above objectives, the technical solutions of the embodiments of the present disclosure are as follows.

In a first aspect, the present disclosure provides a time synchronization method, including:

sending, by a terminal, a target protocol data unit PDU session establishment request to a session management function SMF according to a routing policy, wherein the target PDU session establishment request includes a target virtual dedicated link identifier, the target virtual dedicated link identifier is configured to indicate for the SMF to request a policy control function PCF to acquire corresponding target virtual dedicated link information, and determine a target user plane function UPF and generate a target forwarding rule according to the target virtual dedicated link information, the target virtual dedicated link information includes first interface information, second interface information and target PDU session information; and establishing, by the terminal, a target PDU session with the target user plane function UPF to transmit a time synchronization message through the target PDU session and the interface indicated by the target virtual dedicated link information, wherein the target PDU session is a PDU session established by the target UPF according to the target forwarding rule, and the target forwarding rule is sent to the target UPF by the SMF according to the target virtual dedicated link information.

In a second aspect, the present disclosure provides a time synchronization method, including:

receiving, by a policy control function PCF, a target virtual dedicated link acquisition request sent by a session management function SMF according to a target PDU session establishment request, wherein the target virtual dedicated link acquisition request includes a target virtual dedicated link identifier;

acquiring, by the PCF, target virtual dedicated link information corresponding to a terminal according to the target virtual dedicated link identifier, wherein the target virtual dedicated link information includes first interface information, second interface information and target PDU session information; and sending, by the PCF, the target virtual dedicated link information to the SMF.

In a third aspect, the present disclosure provides a time synchronization method, including:

receiving, by a user plane function UPF, a target forwarding rule sent by a SMF according to target virtual dedicated link information, wherein the target virtual dedicated link information includes first interface information, second interface information and target PDU session information; and establishing, by the UPF, a target PDU session with a terminal according to the target forwarding rule, so as to transmit a time synchronization message through the target PDU session and the interface indicated by the target virtual dedicated link information.

In a fourth aspect, the present disclosure provides a time synchronization apparatus, including:

a sending module, which is used by a terminal to send a target protocol data unit PDU session establishment request to a session management function SMF according to a routing policy, wherein the target PDU session establishment request includes a target virtual dedicated link identifier, the target virtual dedicated link identifier is configured to indicate for the SMF to request a policy control function PCF to acquire corresponding target virtual dedicated link information, and determine a target user plane function UPF and generate a target forwarding rule according to the target virtual dedicated link information, the target virtual dedicated link information includes first interface information, second interface information and target PDU session information; and a response module, which is used by a terminal to establish a target PDU session with the target user plane function UPF to transmit a time synchronization message through the target PDU session and the interface indicated by the target virtual dedicated link information, wherein the target PDU session is a PDU session established by the target UPF according to the target forwarding rule, and the target forwarding rule is sent to the target UPF by the SMF according to the target virtual dedicated link information.

In a fifth aspect, the present disclosure provides a time synchronization apparatus, including:

a receiving module, which is used by a policy control function PCF to receive a target virtual dedicated link acquisition request sent by a session management function SMF according to a target PDU session establishment request, wherein the target virtual dedicated link acquisition request includes a target virtual dedicated link identifier;

an acquisition module, which is used by the PCF to acquire target virtual dedicated link information corresponding to a terminal according to the target virtual dedicated link identifier, wherein the target virtual dedicated link information includes first interface information, second interface information and target PDU session information; and a sending module, which is used by the PCF to send the target virtual dedicated link information to the SMF.

In a sixth aspect, the present disclosure provides a time synchronization apparatus, including:

a receiving module, which is used by a user plane function UPF to receive a target forwarding rule sent by a SMF according to target virtual dedicated link information, wherein the target virtual dedicated link information includes first interface information, second interface information and target PDU session information; and an establishment module, which is used by the UPF to establish a target PDU session with a terminal according to the target forwarding rule, so as to transmit a time synchronization message through the target PDU session and the interface indicated by the target virtual dedicated link information.

In a seventh aspect, the present disclosure provides an electronic device, including a processor, a storage medium and a bus, wherein the storage medium stores machine-readable instructions executable by the processor, when the electronic device is running, the processor communicates with the storage medium through the bus, and the processor executes the machine-readable instructions to perform the steps of the time synchronization method according to any one of the previous implementations.

In an eighth aspect, the present disclosure provides a computer-readable storage medium, on which a computer program is stored, which, when executed by a processor, performs the steps of the time synchronization method according to any one of the foregoing implementations.

Compared with the prior art, the present disclosure has the following beneficial effects.

According to the time synchronization method, the electronic device and the storage medium provided by the embodiments of the present disclosure, a terminal sends a session establishment request of a target protocol data unit PDU to a session management function SMF according to a routing policy, the target PDU session establishment request includes a routing policy, and the routing policy includes a target virtual dedicated link identifier. The target virtual dedicated link identifier is configured to indicate for the SMF to request the policy control function PCF to acquire the corresponding target virtual dedicated link information, and determine the target user plane function UPF and generate the target forwarding rule according to the target virtual dedicated link information. The terminal establishes a target PDU session with a target user plane function UPF. The described method is applied to embodiments of the present application, so that a time synchronization message may be transmitted by means of the target PDU session and an interface indicated by target virtual dedicated link infor-mation, so as to realize the time synchronization between the first clock node to be synchronized connected to the first interface and the second clock node to be synchronized connected to the second interface, without the need for a communication system to support a time synchronization protocol, which is simple to implement, and is advantageous to the rapid deployment and application of a time sensitive networking.

BRIEF DESCRIPTION OF DRAWINGS

In order to illustrate the technical solutions of the embodiments of the present disclosure more clearly, the following drawings that need to be used in the embodiments will be briefly introduced. It is to be understood that the following drawings only show some embodiments of the present disclosure, so they shall not be regarded as limiting the scope. For those ordinarily skilled in the art, other relevant drawings may be obtained according to these drawings without creative efforts.

FIG. 5 (*b*) is a schematic diagram of a virtual dedicated link provided by an embodiment of the present disclosure;

DETAILED DESCRIPTION OF EMBODIMENTS

Figure 1:
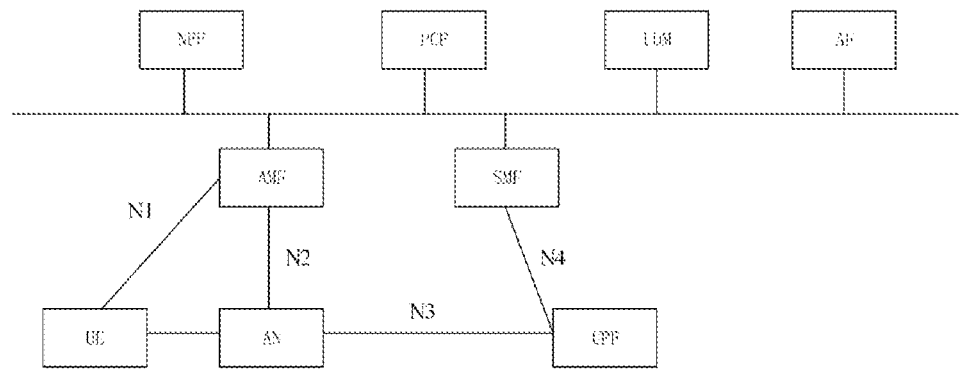
FIG. 1 is a schematic diagram of a network architecture applicable to a time synchronization method provided by an embodiment of the present disclosure.

In order to make the objectives, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are some rather than all of the embodiments of the present disclosure. Generally, the components of the embodiments of the present disclosure described and illustrated in the drawings herein may be arranged and designed in various different configurations.

Therefore, the following detailed description of the embodiments of the present disclosure provided in the drawings is not intended to limit the claimed scope of protection of the present disclosure, but only represents selected embodiments of the present disclosure. Based on the embodiments of the present disclosure, all other embodiment obtained by a person ordinarily skilled in the art without making creative efforts shall fall within the scope of protection of the present disclosure.

It should be noted that similar reference numerals and letters indicate similar items in the following drawings, so once an item is defined in one drawing, it does not need to be further defined and described in subsequent drawings.

The time sensitive networking (TSN) is a set of data link layer protocol specifications. Based on the TSN, the IEEE 802.1AS or IEEE1588 protocol may be adopted to realize time synchronization between clock nodes. The clock nodes may be switches, routers, gateways and other devices to be synchronized that need time synchronization, and the present disclosure is not limited here. For any two clock nodes, a port that publishes the synchronization time on the clock node is called a master port, and a port that receives the synchronization time is called a slave port. The IEEE 802.1AS and IEEE1588 protocols adopt two-layer multicast messages. The basic principle is that the master port periodically sends synchronization messages Sync and follow-up messages Follow_Up to the slave port, and the messages carry time information. After the slave port receives the time information, it is necessary to correct the time according to the link delay between the master port and the slave port, and the slave port sends a latency request message to the master port for latency measurement, so as to realize the time synchronization between the two clock nodes.

At present, when realizing time synchronization between clock nodes based on communication system, it is often necessary to take the communication system as a clock node and add some additional functions, which is complicated in implementation, and is not advantageous to the rapid deployment of a time sensitive networking. For example, in the 5th generation (5G) communication system, it is necessary to enhance the user plane function (UPF) and the user equipment (UE) of the 5G core network, and support the IEEE 802.1AS or IEEE1588 protocol. For the UPF, a network-side converter NW-TT function needs to be added to the UPF; and for the UE, a device-side converter DS-TT function needs to be added to the UE, or the UE needs to be externally connected to the DS-TT, and it is necessary to synchronize the NW-TT and DS-TT functions to the internal clock of 5G system. It can be seen that the existing time synchronization method is highly complex in implementation, and is not advantageous to the rapid deployment and application of a time sensitive networking.

In view of this, an embodiment of the present disclosure provides a time synchronization method, which is simple to implement, and is advantageous to the rapid deployment and application of a time sensitive networking.

Before introducing the present disclosure, firstly, the present disclosure scenario of the embodiments of the present disclosure is described. The technical solutions of the embodiments of the present disclosure may be applied to various communication systems, such as the global system for mobile communications (GSM) system, the code division multiple access (CDMA) system, the wideband code division multiple access (WCDMA) system, the general packet radio service (GPRS), the long term evolution (LTE) system, the LTE frequency division duplex (FDD) system, the LTE time division duplex (TDD), the universal mobile telecommunications system (UMTS), the worldwide interoperability for microwave access (WiMAX) communication system, the 5th generation (5G) communication system, or the new radio access technology (NR) in the future.

FIG. 1 is a schematic diagram of a network architecture applicable to a time synchronization method provided by an embodiment of the present disclosure.

As shown in FIG. 1, the network architecture may be a non-roaming architecture, for example. The network architecture may specifically include the following network elements.

1. User equipment (UE), which may also be called user device, terminal, access terminal, user unit, user station, mobile station, transfer table, remote station, remote terminal, mobile device, user terminal, radio communication device, user agent or user apparatus. The UE may also be a cellular phone, a cordless phone, a session initiation protocol (SIP) phone, a wireless local loop (WLL) station, a personal digital assistant (PDA), a handheld device with radio communication function, a computing device or other processing devices connected to a radio modem, a vehicle-mounted device, a wearable device, a terminal device in a 5G network or a terminal device in a future evolved public land mobile network (PLMN), etc., and may also be an end device, a logical entity, an intelligent device such as a mobile phone, a terminal device such as an intelligent terminal, or a communication device such as a server, a gateway, a base station and a controller, or an Internet of things (IoT) device such as a sensor, an electricity meter or a water meter. It is not limited in the embodiments of the present disclosure.

2. Access network (AN), which provides an access function for authorized users in a specific area, and can use transmission tunnels with different qualities according to the user's level and business requirements. The access network may be an access network adopting different access technologies. At present, there are two types of radio access technology: the 3rd generation partnership project (3GPP) access technology (such as the radio access technology used in the 3G, 4G or 5G systems) and the non-3rd generation partnership project (non-3GPP) access technology. The 3GPP access technology refers to the access technology conforming to the 3GPP standard specifications, and the access network adopting the 3GPP access technology is called radio access network (RAN). The access network device in the 5G system is called the next generation Node Base station (gNB). The non-3GPP access technology refers to the access technology that does not conform to the 3GPP standard specifications, for example, the air interface technology represented by the access point (AP) in the wifi.

The access network that realizes access network function based on radio communication technology may be called a radio access network (RAN). A radio access network can manage radio resources, provide access services for terminals, and complete the forwarding of control signals and user data between terminals and core networks.

The access network device may include devices in the access network that communicate with radio terminals through one or more sectors over the air interface. The access network system may be used to convert the received air frames with the Internet Protocol (IP) packets and act as a router between the radio terminal and the rest of the access network, wherein the rest of the access network may include an IP network. The radio access network system may also coordinate the attribute management of the air interface. It should be understood that the access network device may include, but is not limited to an evolved NodeB (eNB), a radio network controller (RNC), a Node B (NB), a base station controller (BSC), a base transceiver station (BTS), a home base station (e.g., home evolved NodeB or home NodeB (HNB), a base band unit (BBU), an access point (AP) in a wireless fidelity (WIFI) system, a wireless relay node, a wireless backhaul node, a transmission and reception point (TRP) or transmission point (TP), etc., and may also be 5G, such as NR, gNB in a system, or a transmission point (TRP or TP), one antenna panel or a group of antenna panels (including a plurality of antenna panels) of a base station in a 5G system, or a network node constituting a gNB or a transmission point, such as a base band unit (BBU), or a distributed unit (DU).

In some deployments, the gNB may include a centralized unit (CU) and a DU. The GNB may further include a radio unit (RU). The CU realizes some functions of the gNB, while the DU realizes some functions of the gNB, for example, the CU realizes functions of the radio resource control (RRC) and the packet data convergence protocol (PDCP) layer. The DU realizes the functions of the radio link control (RLC), the media access control (MAC) and the physical (PHY) layers. Because the information of the RRC layer will eventually become the information of the PHY layer, or be transformed from the information of the PHY layer, under this architecture, the high-level signaling, such as the RRC layer signaling, may also be considered as being sent by the DU, or sent by the DU and the CU. It can be understood that the access network device may be a CU node, or a DU node, or a device including a CU node and a DU node. In addition, the CU may be classified as an access network device in the radio access network (RAN) or as an access network device in the core network (CN), which is not limited here.

3. Access and mobility management function (AMF) entity, which is mainly used for mobility management and access management, and can be used to realize other functions of the mobility management entity (MME) except the session management, such as lawful interception or access authorization (or authentication). In the embodiments of the present disclosure, it may be used to realize the functions of accessing and moving management network elements.

4. Session management function (SMF) entity, which is mainly used for session management, Internet Protocol (IP) address allocation and management of UE, selection of manageable user plane function, policy control, or the terminal point of the charging function interface and downlink data notification, etc. In the embodiments of the present disclosure, it may be used to realize the function of the session management network element.

5. User plane function (UPF) entity, namely the data plane gateway. It can be used for packet routing and forwarding, or quality of service (QoS) processing of user plane data, etc. The user data can be accessed to the data network (DN) through this network element. In the embodiments of the present disclosure, it can be used to realize the function of the user plane gateway.

6. Network exposure function (NEF) entity, which is configured to securely open services and capabilities provided by 3GPP network functions to the outside world.

7. Network function (NF) repository function (NRF) entity, which is configured to store the description information of network function entities and the services they provide, and to support service discovery and network element entity discovery, etc.

8. Policy control function (PCF) entity, which is a unified policy framework configured to guide network behavior and provide policy rule information for control plane function network elements (such as AMF, SMF network elements).

9. United data management (UDM) entity, which is configured to process user identifier, access authentication, registration, or mobility management.

10. Application function (AF) entity, which is configured for data routing for application influence, accessing network exposure function elements, or interacting with policy framework for policy control.

In this network architecture, the N1 interface is the reference point between the terminal and the AMF entity. The N2 interface is the reference point of the AN and AMF entities, which is configured to send non-access stratum (NAS) messages, etc. The N3 interface is the reference point between the AN and UPF entities, and is configured to transmit user plane data, etc. The N4 interface serves as the reference point between the SMF entity and the UPF entity, and is configured to transmit information such as the tunnel identifier information of the N3 connection, data cache indication information, and downlink data notification messages.

It should be understood that the above-mentioned network architecture applied to the embodiments of the present disclosure is only an illustrated network architecture described from the perspective of traditional point-to-point architecture and service architecture, and the network architecture applicable to the embodiments of the present disclosure is not limited to this, and any network architecture that can realize the functions of the above-mentioned network elements is applicable to the embodiments of the present disclosure. It should be understood that the above-mentioned network elements may communicate with each other through preset interfaces, which will not be described here.

It should also be understood that the AMF entity, the SMF entity, the UPF entity, the NEF entity, the PCF entity and the UDM entity shown in FIG. 1 may be understood as network elements in the core network for realizing different functions, for example, they may be combined into network slices as required.

These core network elements may be independent devices or integrated into the same device to achieve different functions, which is not limited in the present disclosure.

Hereinafter, for the convenience of description, the entity configured to realize the AMF is denoted as the AMF, and the entity configured to realize the PCF is denoted as the PCF. Other symbols are similar to this, and will not be repeated here. It should be understood that the above naming is only intended to distinguish different functions, and does not mean that these network elements are independent physical devices respectively. The specific forms of the above network elements are not limited in the present disclosure, for example, they may be integrated in the same physical device or be different physical devices respectively. In addition, the above naming is only convenient for distinguishing different functions, and should not constitute any limitation on the present disclosure. The present disclosure does not exclude the possibility of adopting other naming in the 5G network and other networks in the future.

For example, in the 6G network, some or all of the above-mentioned network elements may follow the terminology in the 5G, or may adopt other names. A unified description is made here, and will not be repeated in the following.

It should also be understood that the name of the interface between the network elements in FIG. 1 is just an example, and the name of the interface may be other names in the specific implementation, which is not specifically limited in the present disclosure. In addition, the name of the message (or signaling) transmitted between the above-mentioned network elements is only an example, and does not constitute any limitation on the function of the message itself.

Figure 2:
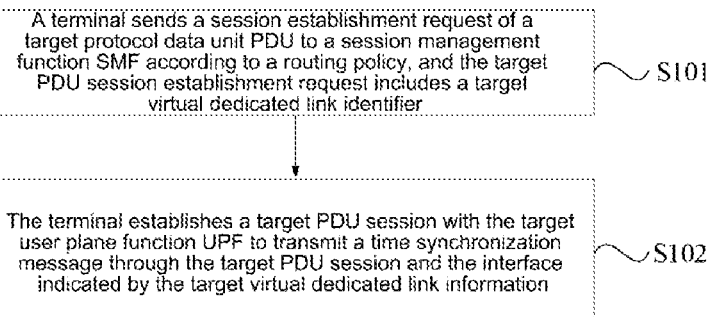
FIG. 2 is a flow diagram of a time synchronization method provided by an embodiment of the present disclosure.

FIG. 2 is a flow diagram of a time synchronization method provided by an embodiment of the present disclosure. The execution subject of the method may be a terminal, that is, the user equipment (UE) in FIG. 1. As shown in FIG. 2, the time synchronization method may include the following steps.

S101: sending, by a terminal, a target PDU session establishment request to a session management function SMF according to a routing policy, wherein the target PDU session establishment request includes a target virtual dedicated link identifier.

The target virtual dedicated link identifier is configured to indicate for the SMF to request the policy control function PCF to acquire the corresponding target virtual dedicated link information, and determine the target UPF and generate the target forwarding rule according to the target virtual dedicated link information. The target virtual dedicated link information includes first interface information, second interface information and target PDU session information.

The policy control function PCF may send a virtual dedicated link subscription request to the unified data management UDM, and receive a subscription event notification replied by the UDM according to the virtual dedicated link subscription request. The subscription event notification may include virtual dedicated link information, which may include interface information and session information. Each virtual dedicated link may contain two interfaces, and each interface information includes the identifier of the device to which the interface belonged, interface number, interface category, etc. The interface category includes UE-side interfaces and network-side interfaces. If it is a UE-side interface, the identification of the device to which the interface belonged is a UE identifier, and if it is a network-side interface, the identifier of the device to which the interface belonged is a UPF identifier. A virtual dedicated link may be composed of a UE-side interface and a network-side interface, or it may be composed of two UE-side interfaces. The session information may include PDU session type, time synchronization message identification information, session quality requirements, etc. The time synchronization message identification information is configured to identify the time synchronization message. For example, if the time synchronization message in accordance with the IEEE 802.1AS and IEEE1588 protocols is transmitted using a data frame with the Ethernet type of 0x88F7, the time synchronization message can be identified by judging whether the Ethernet frame type is 0x88F7. The session quality requirements may include session quality requirement parameters such as maximum latency, maximum jitter, and bandwidth value to be guaranteed. The UE, the RAN and the UPF create QoS flow in the PDU session according to these parameters to ensure the quality of the session.

Of course, the virtual dedicated link information may further include a virtual dedicated link identifier, which is configured to identify the virtual dedicated link, and the virtual dedicated link identifier may be a preset character string, but is not limited to this.

In addition, the PCF may also receive the control policy request sent by the access and mobility management function AMF according to the registration request of the terminal. The control policy request may include the identifier of the terminal. According to the control policy request, a routing policy corresponding to the terminal can be generated. The routing policy is sent to the AMF to be forwarded to the terminal by the AMF.

Based on the above description, after receiving the data frame from the interface on the terminal side, the terminal may match with the relevant information in the routing policy (for example, the traffic descriptor parameter, which may include at least one interface information, time synchronization message identification information, etc.) and determine whether to use the established PDU session or to create a new PDU session. If a new PDU session is needed to create, the terminal may initiate a PDU session establishment request to the network side. For the terminal, when a session of a target protocol data unit PDU needs to be established, based on the network architecture of FIG. 1, the terminal may send a session establishment request of the target protocol data unit PDU to the session management function SMF according to the routing policy. In the specific sending process, the terminal may send the target PDU session establishment request to the access network AN, the access network AN may send the target PDU session establishment request to the AMF, and the AMF may forward the request to the SMF. The target PDU session establishment request may include the target virtual dedicated link identifier.

For the SMF, after receiving the target PDU session establishment request, the SMF may send a target virtual dedicated link acquisition request to the policy control function PCF according to the target PDU session establishment request. Based on the above description, the PCF may further acquire the target virtual dedicated link information corresponding to the terminal according to the target virtual dedicated link identifier, and send the target virtual dedicated link information to the SMF. After receiving the target virtual dedicated link information, the SMF may determine the target user plane function UPF and generate the target forwarding rule.

The target virtual dedicated link information may include first interface information, second interface information and target PDU session information.

The target PDU session information may be a PDU session including a time synchronization message, which may be identified by a preset time synchronization message identification message. For example, when the time synchronization message in accordance with the IEEE 802.1AS and IEEE1588 protocols is transmitted using a data frame with an Ethernet type of 0x88F7, the time synchronization message may be identified by judging whether the Ethernet type is 0x88F7, but it is not limited to this. Of course, the target PDU session information may further include other information. For example, it may include but is not limited to: PDU session ID, session type (IPv4, IPv6, IPv4v6, Ethernet, unstructured), uplink and downlink rate, billing ID, roaming status information, IP information of UE, PCF information, Qos information, tunnel information, destination address, SMF identifier, AMF information, session management information, UPF ID, online billing identifier, and offline billing identifier.

Optionally, the first interface information may be interface information of a terminal-side interface, and the second interface information may be interface information of a network-side interface. Alternatively, the first interface information may be the interface information of the network-side interface, and the second interface information may be the interface information of the terminal-side interface. Alternatively, both the first interface information and the second interface information are interface information of the terminal-side interface, which is not limited here, and may be different according to actual application scenarios.

S102: establishing, by the terminal, a target PDU session with the target user plane function UPF to transmit a time synchronization message through the target PDU session and the interface indicated by the target virtual dedicated link information.

The target PDU session is a PDU session established by the target UPF according to the target forwarding rule, and the target forwarding rule is sent to the target UPF by the SMF according to the target virtual dedicated link information.

Based on the above description, after the SMF generates the target forwarding rule according to the target virtual dedicated link information, it may send the target forwarding rule to the target UPF, and after receiving the target forwarding rule, the target UPF may establish a target PDU session with the terminal according to the target forwarding rule, correspondingly, that is, the terminal may establish a target PDU session with the target UPF. So far, the target PDU session has been established. Then the terminal may transmit the time synchronization message through the interface indicated by the target PDU session and the target virtual dedicated link information, that is, the terminal may carry the time synchronization message in the target PDU session and transmit it according to the interface indicated by the target virtual dedicated link information.

Based on the above embodiments, it can be understood that if the first interface information indicates the interface information of the terminal side and the second interface information indicates the interface information of the network side, the terminal may transmit the time synchronization message received from the target PDU session from the first interface indicated by the first interface information of the terminal side to the second interface indicated by the second interface information of the network side. Of course, the target UPF may also transmit the time synchronization message received from the target PDU session from the second interface indicated by the second interface information of the network side to the first interface indicated by the first interface information of the terminal side, which is not limited here. According to the types of the first interface and the second interface, the transmission mode may be different. By applying the embodiment of the present disclosure, the time synchronization between the first clock node to be synchronized connected to the first interface and the second clock node to be synchronized connected to the second interface can be realized, which are simple to implement.

To sum up, the time synchronization method provided by the embodiment of the present disclosure includes: sending, by a terminal, a target protocol data unit PDU session establishment request to a session management function SMF according to a routing policy, wherein the target PDU session establishment request includes a target virtual dedicated link identifier, the target virtual dedicated link identifier is configured to indicate for the SMF to request a policy control function PCF to acquire corresponding target virtual dedicated link information, and determine a target user plane function UPF and generate a target forwarding rule according to the target virtual dedicated link information; and establishing, by the terminal, a target PDU session with the target user plane function UPF. The described method is applied to embodiments of the present application, so that a time synchronization message may be transmitted by means of the target PDU session and an interface indicated by target virtual dedicated link information, so as to realize the time synchronization between the first clock node to be synchronized connected to the first interface and the second clock node to be synchronized connected to the second interface, without the need for a communication system to support a time synchronization protocol, which is simple to implement, and is advantageous to the rapid deployment and application of a time sensitive networking.

Figure 3:
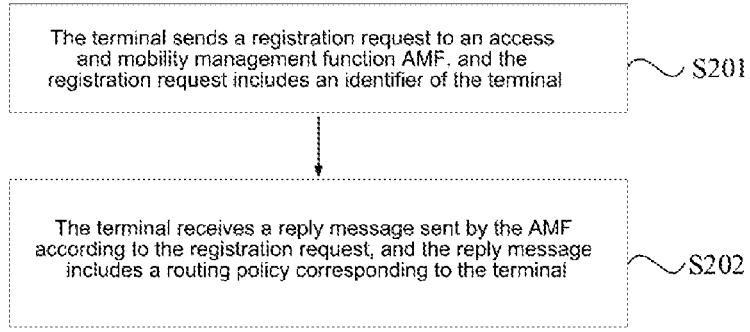
FIG. 3 is a flow diagram of another time synchronization method provided by an embodiment of the present disclosure.
Figure 4:
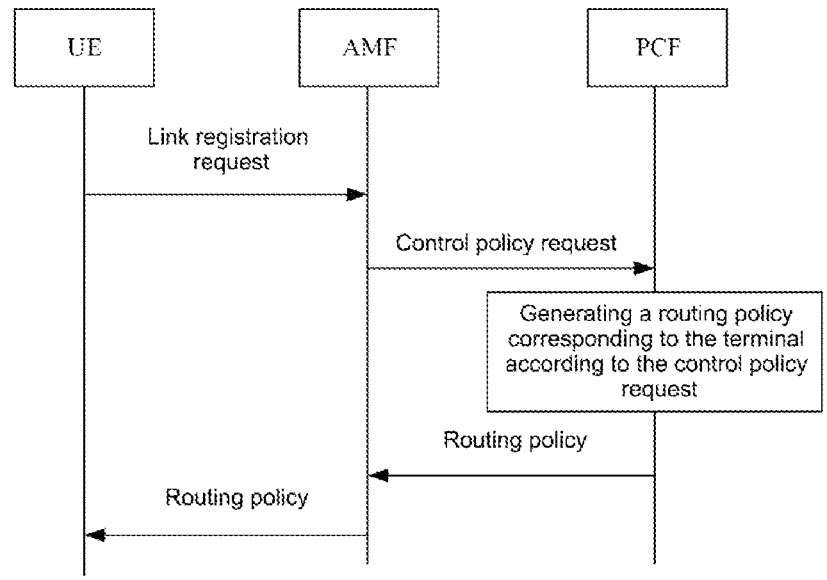
FIG. 4 is an interactive flow diagram of a time synchronization method provided by an embodiment of the present disclosure.

FIG. 3 is a flow diagram of another time synchronization method provided by an embodiment of the present disclosure, and FIG. 4 is an interactive flow diagram of a time synchronization method provided by an embodiment of the present disclosure. Optionally, as shown in FIGS. 3 and 4, before the sending, by a terminal, a target protocol data unit PDU session establishment request to a session management function SMF according to a routing policy, the time synchronization method further includes the following steps.

S201: sending, by the terminal, a registration request to an access and mobility management function AMF, wherein the registration request includes an identifier of the terminal.

The registration request is configured to request the AMF to send a control policy request to the policy control function PCF.

The identifier of the terminal may be a general public subscription identifier (GPSI), a permanent equipment identifier (PEI), a subscription permanent identifier (SUPI), a subscription concealed identifier (SUSI), etc., which is not limited here. In some embodiments, the terminal may send a registration request to the access network AN, and the access network AN may further forward the registration request to the AMF. After receiving the registration request, the AMF may send the control policy request to the policy control function PCF. Based on the above description, since the policy control function PCF can store a plurality of pieces of virtual dedicated link information, the PCF can judge whether it is necessary to create a virtual dedicated link associated with the UE according to the control policy request. Optionally, if the PCF finds the virtual dedicated link associated with the UE according to the identifier of the terminal, it means that it needs to be created, otherwise, it means that it does not need to be created.

If it is determined that it needs to be created, the PCF may determine the target virtual dedicated link identifier corresponding to the terminal according to the identifier of the terminal, and may generate a reply message according to the target virtual dedicated link identifier. The reply message may include the routing policy corresponding to the terminal, and the routing policy may include the target virtual dedicated link identifier, which is configured to indicate the target virtual dedicated link corresponding to the terminal, and the target virtual dedicated link is configured to transmit time synchronization messages. The PCF may further send the reply message to the AMF.

S202: receiving, by the terminal, a reply message sent by the AMF according to the registration request, wherein the reply message includes a routing policy corresponding to the terminal.

The routing policy includes a target virtual dedicated link identifier configured to indicate the target virtual dedicated link corresponding to the terminal, and the target virtual dedicated link is configured to transmit the time synchronization message, wherein the target virtual dedicated link corresponding to the terminal is determined by the PCF according to the identifier of the terminal.

After receiving the reply message sent by the PCF according to the registration request, the AMF may further forward the reply message to the terminal through other network elements (such as the access network AN), and the terminal may know its corresponding target virtual dedicated link identifier and the interface indicated by the target virtual dedicated link information according to the routing policy, and may transmit the time synchronization message according to the target PDU session and the interface indicated by the target virtual dedicated link information.

Figure 5A:
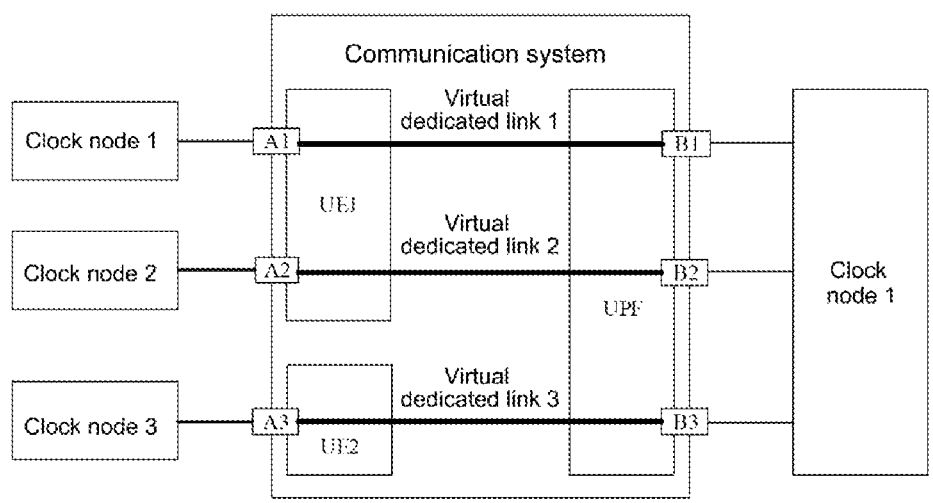
FIG. 5 (*a*) is a schematic diagram of a virtual dedicated link provided by an embodiment of the present disclosure.
Figure 5B:
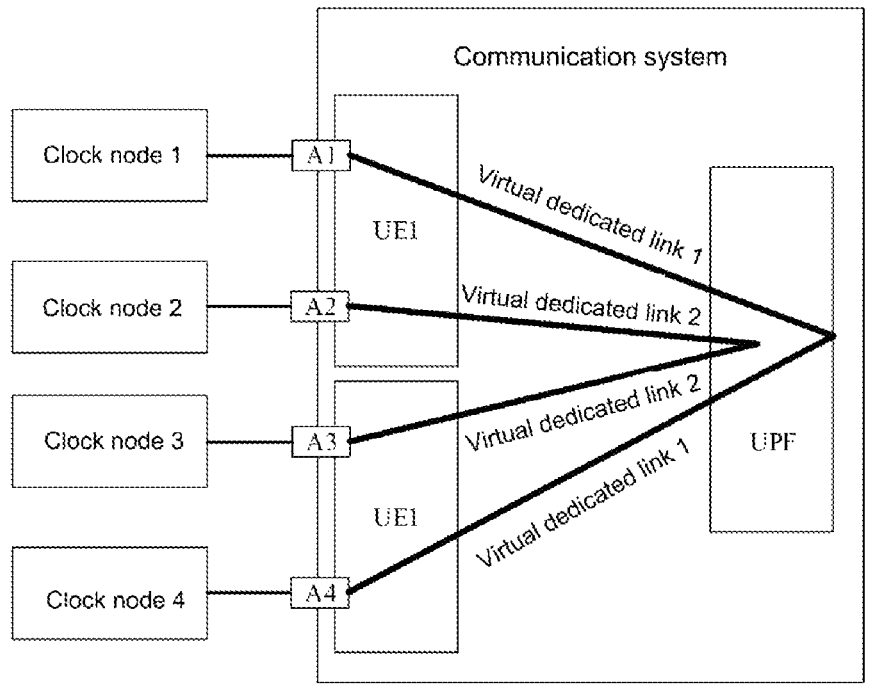

FIG. 5 (a) is a schematic diagram of a virtual dedicated link provided by an embodiment of the present disclosure, and FIG. 5 (b) is a schematic diagram of a virtual dedicated link provided by an embodiment of the present disclosure.

According to different target PDU session establishment requests, the interfaces indicated by the first interface information and the second interface information can be different, which can be classified as follows.

As shown in FIG. 5 (a), if it is necessary to realize the time synchronization between the clock node 1 of the terminal-side UE1 and the clock node 1 of the network-side UPF, the first interface information may indicate the information of the terminal-side interface A1 and the second interface information may indicate the information of the network-side interface B1. Alternatively, the first interface information may indicate the information of the network interface B1, the second interface information may indicate the information of the terminal interface A1, and the virtual dedicated link 1 may refer to the link between the terminal interface A1 and the network interface B1. As shown in FIG. 5 (b), if it is necessary to realize the time synchronization between the clock node 1 of the terminal-side UE1 and the clock node 4 of the terminal-side UE2, the first interface information may indicate the information of the terminal-side interface A1 and the second interface information may indicate the information of the terminal-side interface A4. Alternatively, the first interface information may indicate the information of the terminal-side interface A4, the second interface information may indicate the information of the terminal-side interface A1, and the virtual dedicated link 1 may refer to the link between the terminal-side interface A1 and the network-side interface A4.

To sum up, by applying the embodiment of the present disclosure, based on the target virtual dedicated link established between the first interface and the second interface, the time synchronization message can be transmitted through the target PDU session and the interface indicated by the target virtual dedicated link information, so as to realize the time synchronization between the terminal-side clock node and the network-side clock node (the interface indicated by the first interface information is a terminal-side interface or a network-side interface, and the interface indicated by the second interface information is a network-side interface or a terminal-side interface), or the time synchronization between a plurality of terminal-side clock nodes (the interfaces indicated by the first interface information and the second interface information are both terminal-side interfaces), which is simple to implement, and is advantageous to the rapid deployment and application of a time sensitive networking.

Optionally, the routing policy further includes at least one interface information and time synchronization message identification information. The at least one interface information may indicate the forwarding interface of the time synchronization message. The interface information may include interface identifier, such as, but not limited to, interface number. The time synchronization message identification information may be used to identify the quantity traffic of the time synchronization message, for example, it may be, but is not limited to, the data traffic with the Ethernet frame type of 0x88F7. That is, the routing policy can be understood as including information that maps at least one interface information and time synchronization message identification information to a PDU session.

In some embodiments, the sending, by a terminal, a target protocol data unit PDU session establishment request to a session management function SMF according to a routing policy includes:

sending, after the terminal receives data through a terminal-side interface, the target protocol data unit PDU session establishment request to the SMF according to the routing policy based on the interface information and the time synchronization message identification information.

The clock node that needs time synchronization on the terminal side may communicate with the terminal through the terminal-side interface, and the clock node that needs time synchronization may send data frames (such as Ethernet frames) to the terminal through the terminal-side interface. Based on the above description, it can be understood that the terminal may receive a reply message sent by the AMF according to the registration request. The reply message may include the routing policy corresponding to the terminal.

Optionally, after receiving the data frame, the terminal may match with the routing policy (at least one interface information, time synchronization message identification information, etc.), and it can be determined whether a new PDU session is needed to create through matching. If it is determined that a new PDU session is needed to create, the terminal may send a target protocol data unit PDU session establishment request to the SMF based on the at least one interface information and time synchronization message identification information to request to create a separate PDU session for each designated interface. The target protocol data unit PDU session establishment request will include, but is not limited to, the target virtual dedicated link identifier.

Optionally, the above target PDU session information may include a session quality parameter. The session quality parameter may include, but is not limited to: maximum latency, maximum jitter, guaranteed bandwidth, etc., such that in the process of creating the target PDU session, the PCF may also generate the quality of service (QoS) rule according to the session quality parameters of the target virtual dedicated link and send it to the SMF. The SMF sends the quality of service (QoS) rule to the UE, the AN, and the UPF to ensure the latency and jitter of the target virtual dedicated link between the UE and the UPF and ensure the accuracy of time synchronization.

Optionally, the target forwarding rule is that the UPF forwards the time synchronization message, received from the PDU session by the first interface, from the second interface, and forwards the time synchronization message received by the second interface to the first interface through the PDU session; or the UPF forwards the time synchronization message, received by the first interface from the PDU session, from a PDU session corresponding to the second interface to the second interface, and forwards the time synchronization message received by the second interface to the first interface through the PDU session corresponding to the first interface.

Based on the above 5(a), if it is necessary to realize the time synchronization between the clock node 1 of the terminal UE1 and the clock node 1 of the network UPF, the target forwarding rule can be as follows: the time synchronization message received by the UPF from the PDU session based on the terminal interface A1 needs to be forwarded from the network interface B1; and the time synchronization message based on the connection of the network interface B1 needs to be forwarded to the terminal interface A1 through the PDU session. As shown in FIG. 5 (b), if it is necessary to realize the time synchronization between the clock node 1 of the terminal-side UE1 and the clock node 4 of the terminal-side UE2, the target forwarding rule may be as follows: the time synchronization message received by the UPF from the PDU1 session based on the terminal-side interface A1 needs to be forwarded to the terminal-side interface A4 from the PDU2 session corresponding to the terminal-side interface A4; and the time synchronization message received from the PDU2 session based on the terminal-side interface A4 needs to be forwarded to the terminal-side interface A1 through the PDU1 session corresponding to the terminal-side interface A1. Of course, the setting of the target rule is not limited to this. By applying the embodiment of the present disclosure, two PDU sessions are bound for a virtual dedicated link including two terminal-side interfaces (UE interfaces) through a target forwarding rule.

For a virtual dedicated link including a UE-side interface and a network-side interface, the designated interface of the UPF is bound with the designated PDU session to construct a virtual dedicated link.

Figure 6:
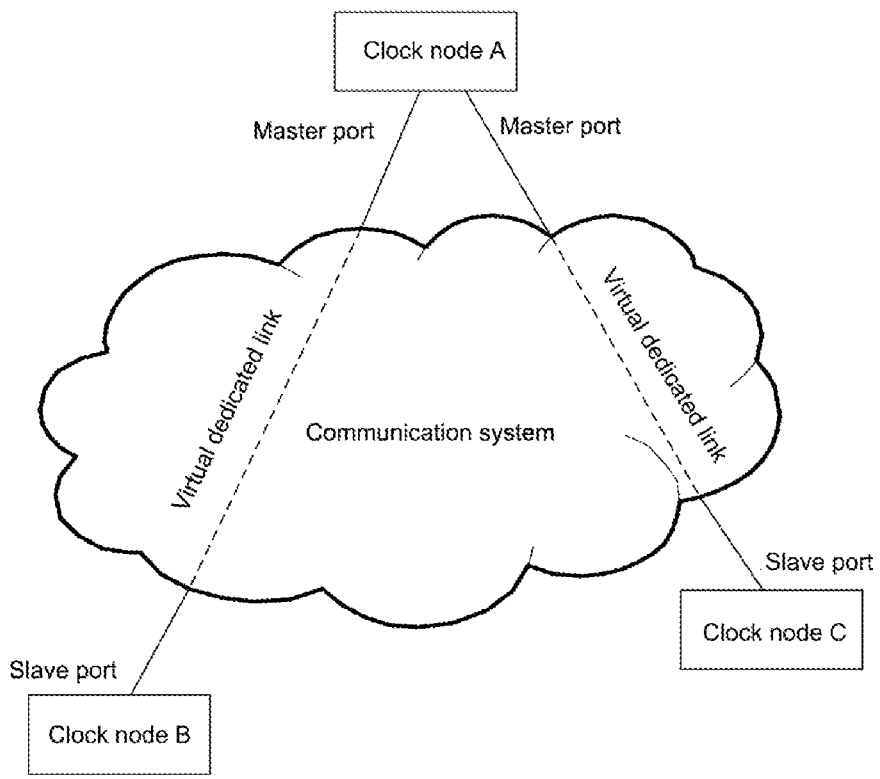
FIG. 6 is a schematic diagram of an application scenario of a time synchronization method provided by an embodiment of the present disclosure.

FIG. 6 is a schematic diagram of an application scenario of a time synchronization method provided by an embodiment of the present disclosure.

As shown in FIG. 6, by applying the embodiment of the present disclosure, a virtual dedicated link can be created by using a communication system to connect master ports and slave ports of different clock nodes (the master port of the clock node A and the slave port of the clock node B are connected, and the master port of the clock node A and the slave port of the clock node C are connected). For clock nodes, the existence of the communication system is not perceived; and for the communication system, the time synchronization protocol is not perceived, which is simple to implement, and is advantageous to the rapid deployment and application of a time sensitive networking.

Figure 7:
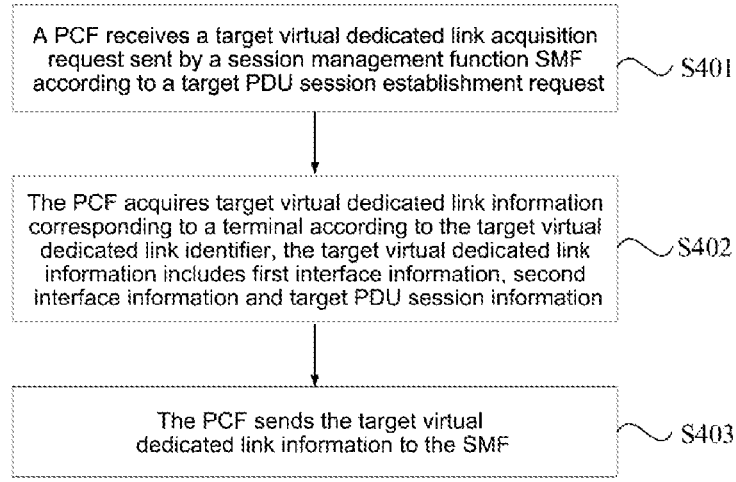
FIG. 7 is a flow diagram of another time synchronization method provided by an embodiment of the present disclosure.
Figure 8:
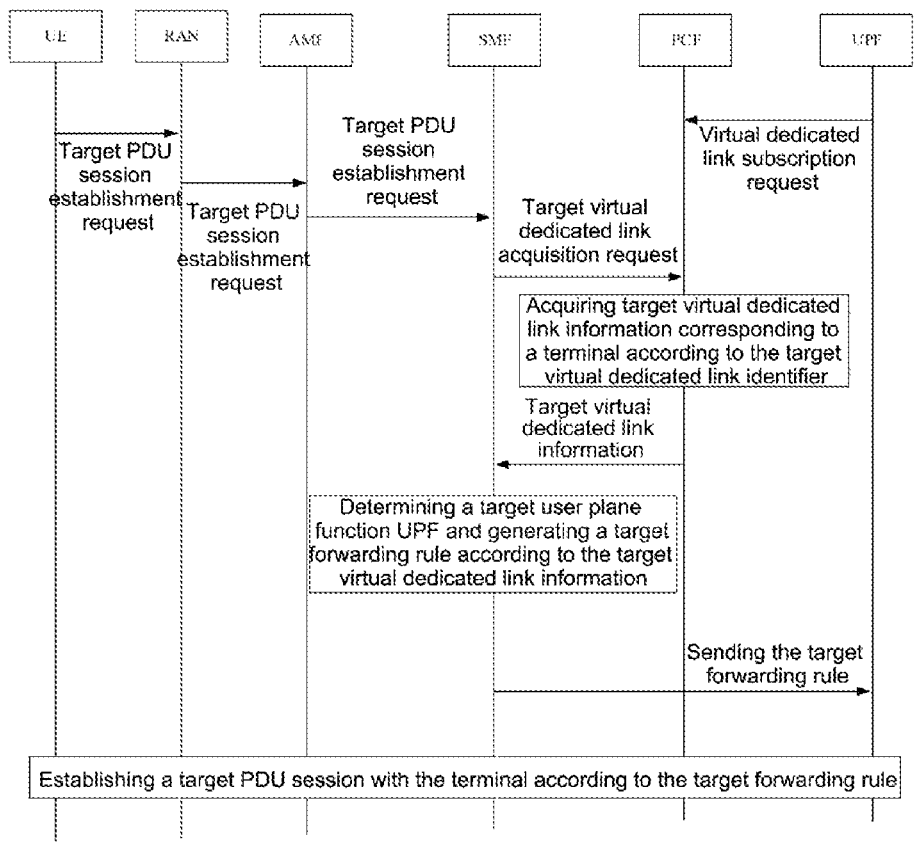
FIG. 8 is an interactive flow diagram of another time synchronization method provided by an embodiment of the present disclosure.

FIG. 7 is a flow diagram of another time synchronization method provided by an embodiment of the present disclosure, and FIG. 8 is an interactive flow diagram of another time synchronization method provided by an embodiment of the present disclosure. The execution subject of the method may be the PCF in the aforementioned network architecture, and as shown in FIGS. 7 and 8, the time synchronization method may include:

S401: receiving, by a policy control function PCF, a target virtual dedicated link acquisition request sent by a session management function SMF according to a target PDU session establishment request, wherein the target virtual dedicated link acquisition request includes a target virtual dedicated link identifier;

S402: acquiring, by the PCF, target virtual dedicated link information corresponding to a terminal according to the target virtual dedicated link identifier, wherein the target virtual dedicated link information includes first interface information, second interface information and target PDU session information; and S403: sending, by the PCF, the target virtual dedicated link information to the SMF.

Referring to FIG. 8, regarding PCF, the PCF may receive the target virtual dedicated link acquisition request sent by the session management function SMF according to the target PDU session establishment request, acquire the target virtual dedicated link information corresponding to the terminal according to the target virtual dedicated link identifier included in the target virtual dedicated link acquisition request, and send the target virtual dedicated link information to the SMF, then the SMF may determine the target user plane function UPF and generate the target forwarding rule according to the target virtual dedicated link information. When the target user plane function UPF is optionally determined, the corresponding target user plane function UPF can be determined according to the target virtual dedicated link information. For the description of other parts, it is possible to refer to the relevant parts mentioned above, which will not be repeated here.

Figure 9:
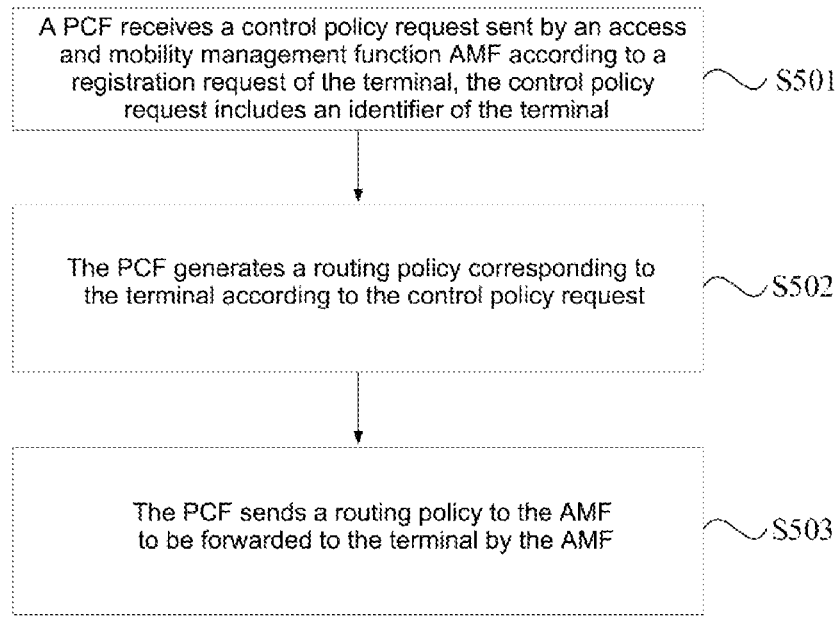
FIG. 9 is a flow diagram of another time synchronization method provided by an embodiment of the present disclosure.

FIG. 9 is a flow diagram of another time synchronization method provided by an embodiment of the present disclosure. Optionally, as shown in FIGS. 9 and 4, before the receiving, by a policy control function PCF, a target virtual dedicated link acquisition request sent by a session management function SMF according to a target PDU session establishment request, the time synchronization method further includes:

S501: receiving, by the PCF, a control policy request sent by an access and mobility management function AMF according to a registration request of the terminal, wherein the control policy request includes an identifier of the terminal;

S502: generating, by the PCF, a routing policy corresponding to the terminal according to the control policy request; and S503: sending, by the PCF, a routing policy to the AMF to be forwarded to the terminal by the AMF.

Referring to FIG. 4, after the terminal sends a registration request to the access and mobility management function AMF, the AMF may further send a control policy request to the PCF according to the registration request. After receiving the control policy request, the PCF may generate the routing policy corresponding to the terminal according to the control policy request, and send it to the AMF to be forwarded to the terminal by the AMF. It is possible to refer to the relevant instructions mentioned above for the related interaction process, which will not be repeated here.

By applying the embodiment of the present disclosure, the PCF can acquire the target virtual dedicated link information corresponding to the terminal according to the target virtual dedicated link acquisition request sent by the SMF, and the SMF can determine the target user plane function UPF and generate the target forwarding rule according to the target virtual dedicated link information, and send the target forwarding rule to the target UPF. Then, the target UPF may establish a target PDU session with the terminal according to the target forwarding rule, so as to transmit the time synchronization message through the interface indicated by the target PDU session and the target virtual dedicated link information, thus realizing the time synchronization between the first clock node to be synchronized connected to the first interface and the second clock node to be synchronized connected to the second interface, which is simple to implement, and is advantageous to the rapid deployment and application of a time sensitive networking.

Figure 10:
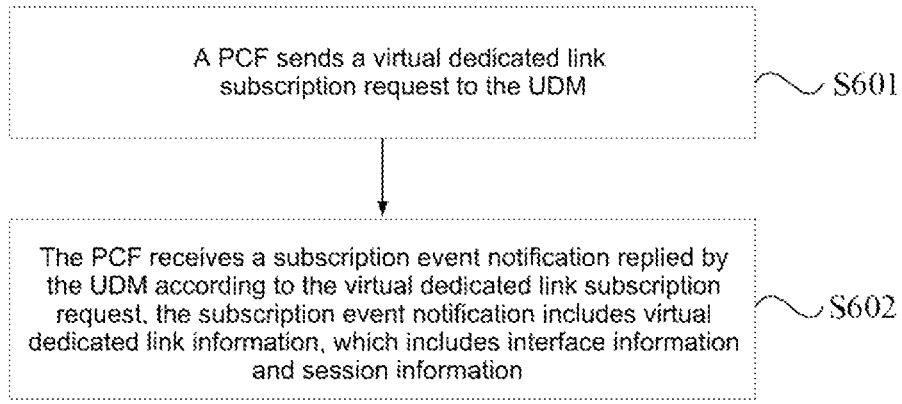
FIG. 10 is a flow diagram of another time synchronization method provided by an embodiment of the present disclosure.
Figure 11:
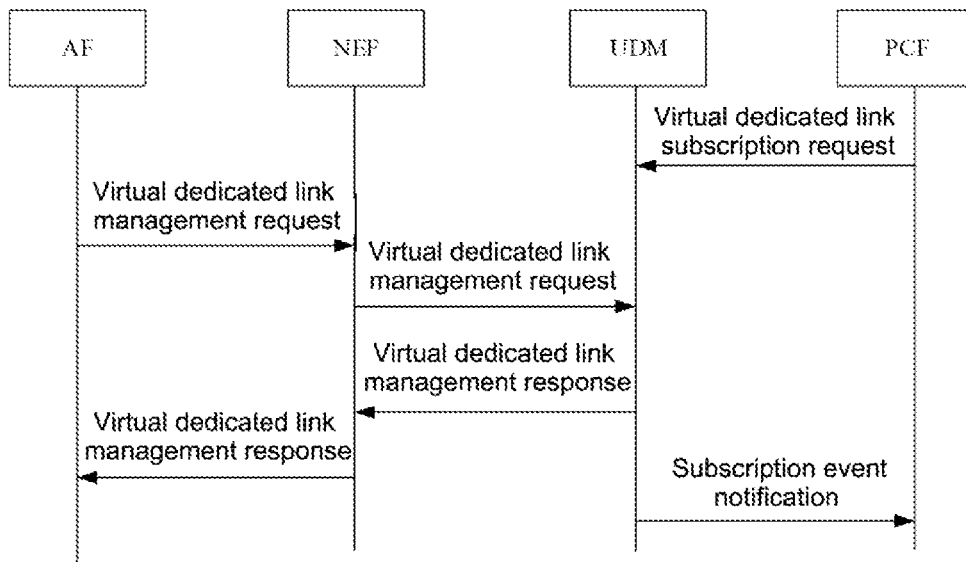
FIG. 11 is an interactive flow diagram of another time synchronization method provided by an embodiment of the present disclosure.

FIG. 10 is a flow diagram of another time synchronization method provided by an embodiment of the present disclosure, and FIG. 11 is an interactive flow diagram of another time synchronization method provided by an embodiment of the present disclosure. Optionally, as shown in FIGS. 10 and 11, before the receiving, by a policy control function PCF, a target virtual dedicated link acquisition request sent by a session management function SMF according to a target PDU session establishment request, the time synchronization method further includes:

S601: sending, by the PCF, a virtual dedicated link subscription request to a UDM; and S602: receiving, by the PCF, a subscription event notification replied by the UDM according to the virtual dedicated link subscription request, wherein the subscription event notification includes virtual dedicated link information, which includes interface information and session information.

Referring to FIG. 11, the virtual dedicated link information is created by a network exposure function NEF in response to a request of an application function AF, and then acquired and sent to the UDM, that is, the virtual dedicated link information is created by the NEF in response to the request of the AF, and then forwarded to the UDM. Alternatively, the AF may send a request message for virtual dedicated link management to the NEF, which may request to create a virtual dedicated link, to update a virtual dedicated link, or to delete of a virtual dedicated link. The request to create and update a virtual dedicated link may carry virtual dedicated link information. The request to delete a virtual dedicated link may only carry a virtual dedicated link identifier, but it is not limited to this.

Regarding PCF, the PCF may send a virtual dedicated link subscription request to the UDM. After the UDM receives the virtual dedicated link subscription request, if the UDM receives the request message of virtual dedicated link management (creation, deletion and update), for the request to create and update a virtual dedicated link, the UDM may store the virtual dedicated link information or save the information in the unified data repository UDR; and for the request to delete the virtual dedicated link, the UDM deletes the relevant information or requests the UDR to delete the relevant information, which is not limited here. After creation, update or deletion, the UDM may send a virtual dedicated link management response to the NEF and a subscription event notification to the PCF. Regarding NEF, the NEF may further send the virtual dedicated link management response to the AF.

Figure 12:
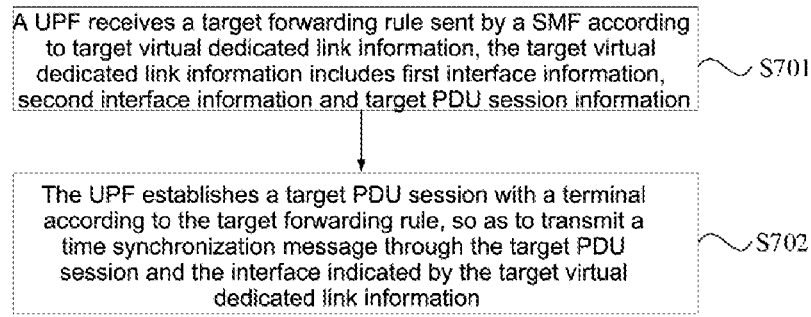
FIG. 12 is a flow diagram of another time synchronization method provided by an embodiment of the present disclosure.

FIG. 12 is a flow diagram of another time synchronization method provided by an embodiment of the present disclosure. The execution subject of the method may be the UPF in the network architecture, specifically the target UPF selected by the SMF according to the PDU session establishment request of the terminal. As shown in FIGS. 12 and 8, the time synchronization method may include:

S701: receiving, by a user plane function UPF, a target forwarding rule sent by a SMF according to target virtual dedicated link information, wherein the target virtual dedicated link information includes first interface information, second interface information and target PDU session information; and S702: establishing, by the UPF, a target PDU session with a terminal according to the target forwarding rule, so as to transmit a time synchronization message through the target PDU session and the interface indicated by the target virtual dedicated link information.

Based on the above description, referring to FIG. 8, the SMF may determine the target UPF and generate the target forwarding rule according to the target virtual dedicated link information, the generated target forwarding rule may be sent to the UPF, and the UPF may establish the target PDU session with the terminal according to the target forwarding rule, such that the time synchronization messages may be transmitted through the established target PDU session and the interface indicated by the target virtual dedicated link information, so that the time synchronization between clock nodes can be achieved through the virtual dedicated link channel with deterministic delay and jitter, and the communication system does not need to support any specific time synchronization protocol, which simplifies the implementation and does not need to maintain time synchronization between the UE and the UPF, which is beneficial to the rapid deployment of a time sensitive networking.

Figure 13:
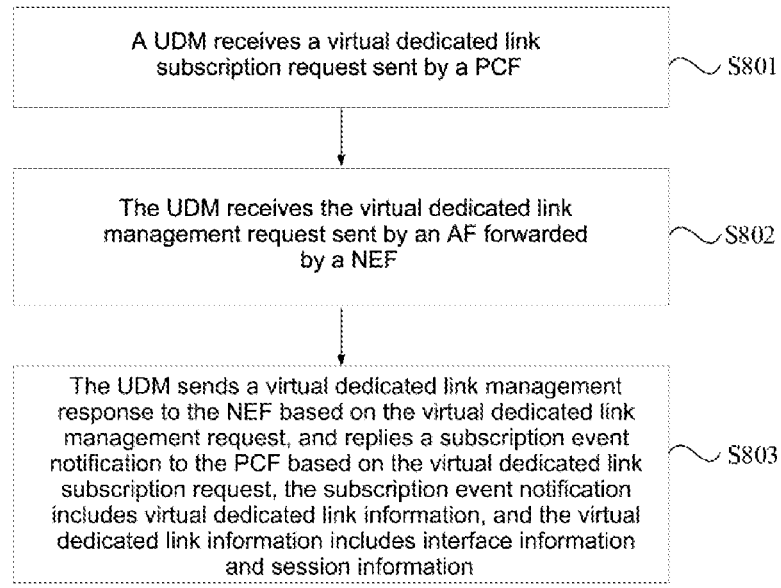
FIG. 13 is a flow diagram of another time synchronization method provided by an embodiment of the present disclosure.

FIG. 13 is a flow diagram of another time synchronization method provided by an embodiment of the present disclosure, and the execution subject of the method may be the UDM in the aforementioned network architecture. As shown in FIGS. 13 and 11, the time synchronization method may include:

S801: receiving, by the UDM, a virtual dedicated link subscription request sent by the PCF;

S802: receiving, by the UDM, the virtual dedicated link management request sent by the AF forwarded by the NEF; and S803: sending, by the UDM, a virtual dedicated link management response to the NEF based on the virtual dedicated link management request, and replying a subscription event notification to the PCF based on the virtual dedicated link subscription request, wherein the subscription event notification includes virtual dedicated link information, and the virtual dedicated link information includes interface information and session information.

It is possible to refer to the above-mentioned related description for the description of this part, which will not be repeated here.

In the time synchronization method provided by the embodiment of the present disclosure, a terminal sends a target protocol data unit PDU session establishment request to a session management function SMF according to a routing policy, the target PDU session establishment request includes a target virtual dedicated link identifier, the target virtual dedicated link identifier is configured to indicate for the SMF to request a policy control function PCF to acquire corresponding target virtual dedicated link information, and determine a target user plane function UPF and generate a target forwarding rule according to the target virtual dedicated link information. The terminal establishes a target PDU session with a target user plane function UPF. The described method is applied to embodiments of the present application, so that a time synchronization message may be transmitted by means of the target PDU session and an interface indicated by target virtual dedicated link information, so as to realize the time synchronization between the first clock node to be synchronized connected to the first interface and the second clock node to be synchronized connected to the second interface, without the need for a communication system to support a time synchronization protocol, which is simple to implement, and is advantageous to the rapid deployment and application of a time sensitive networking.

Figure 14:
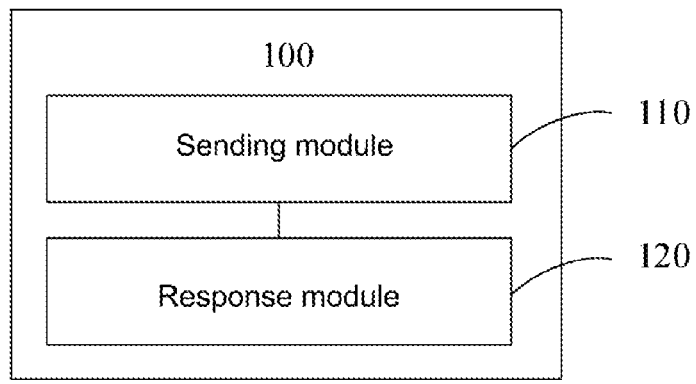
FIG. 14 is a schematic diagram of a functional module of a time synchronization apparatus provided by an embodiment of the present disclosure.

FIG. 14 is a schematic diagram of a functional module of a time synchronization apparatus provided by an embodiment of the present disclosure. The basic principle and technical effects of the device are the same as those of the corresponding method embodiment mentioned above. For brief description, for those not mentioned in this embodiment, it is possible to refer to the corresponding contents in the method embodiment. As shown in FIG. 14, the time synchronization apparatus may include:

a sending module 110, which is used by a terminal to send a target protocol data unit PDU session establishment request to a session management function SMF according to a routing policy, wherein the target PDU session establishment request includes a target virtual dedicated link identifier, the target virtual dedicated link identifier is configured to indicate for the SMF to request a policy control function PCF to acquire corresponding target virtual dedicated link information, and determine a target user plane function UPF and generate a target forwarding rule according to the target virtual dedicated link information, the target virtual dedicated link information includes first interface information, second interface information and target PDU session information, and a response module 120, which is used by a terminal to establish a target PDU session with the target user plane function UPF to transmit a time synchronization message through the target PDU session and the interface indicated by the target virtual dedicated link information, wherein the target PDU session is a PDU session established by the target UPF according to the target forwarding rule, and the target forwarding rule is sent to the target UPF by the SMF according to the target virtual dedicated link information.

In an optional embodiment, the time synchronization apparatus further includes a registration module, which is used by the terminal to send a registration request to an access and mobility management function AMF. The registration request includes an identifier of the terminal, and the registration request is configured to request the AMF to send a control policy request to the policy control function PCF.

The terminal receives a reply message sent by the AMF according to the registration request, the reply message includes a routing policy corresponding to the terminal, the routing policy includes a target virtual dedicated link identifier configured to indicate the target virtual dedicated link corresponding to the terminal, and the target virtual dedicated link is configured to transmit the time synchronization message. The target virtual dedicated link corresponding to the terminal is determined by the PCF according to the identifier of the terminal.

In an optional embodiment, the routing policy further includes: at least one interface information and time synchronization message identification information; and the sending module is specifically configured to send, after the terminal receives data through a terminal-side interface, the target protocol data unit PDU session establishment request to the SMF according to the routing policy based on the interface information and the time synchronization message identification information.

In an optional embodiment, the target forwarding rule is that the UPF forwards the time synchronization message, received from the PDU session by the first interface, from the second interface, and forwards the time synchronization message received by the second interface to the first interface through the PDU session; or the UPF forwards the time synchronization message, received by the first interface from the PDU session, from a PDU session corresponding to the second interface to the second interface, and forwards the time synchronization message received by the second interface to the first interface through the PDU session corresponding to the first interface.

Optionally, the present disclosure further provides a time synchronization apparatus. The basic principle and technical effects of the device are the same as those of the corresponding method embodiment mentioned above. For brief description, it is possible to refer to the corresponding contents in the method embodiments for those not mentioned in this embodiment. The time synchronization apparatus may include:

a receiving module, which is used by a policy control function PCF to receive a target virtual dedicated link acquisition request sent by a session management function SMF according to a target PDU session establishment request, wherein the target virtual dedicated link acquisition request includes a target virtual dedicated link identifier;

an acquisition module, which is used by the PCF to acquire target virtual dedicated link information corresponding to a terminal according to the target virtual dedicated link identifier, wherein the target virtual dedicated link information includes first interface information, second interface information and target PDU session information; and a sending module, which is used by the PCF to send the target virtual dedicated link information to the SMF.

In an optional embodiment, the time synchronization apparatus further includes a generation module, which is used by the PCF to receive a control policy request sent by an access and mobility management function AMF according to a registration request of the terminal, wherein the control policy request includes an identifier of the terminal;

generate, by the PCF, a routing policy corresponding to the terminal according to the control policy request; and send, by the PCF, a routing policy to the AMF to be forwarded to the terminal by the AMF.

In an optional implementation, the time synchronization apparatus further includes a subscription module which is used by the PCF to send a virtual dedicated link subscription request to a unified data management UDM.

The PCF receives a subscription event notification replied by the UDM according to the virtual dedicated link subscription request, wherein the subscription event notification includes virtual dedicated link information, which includes interface information and session information. The virtual dedicated link information is created by a network exposure function NEF in response to a request of an application function AF, and then acquired and sent to the UDM.

Figure 15:
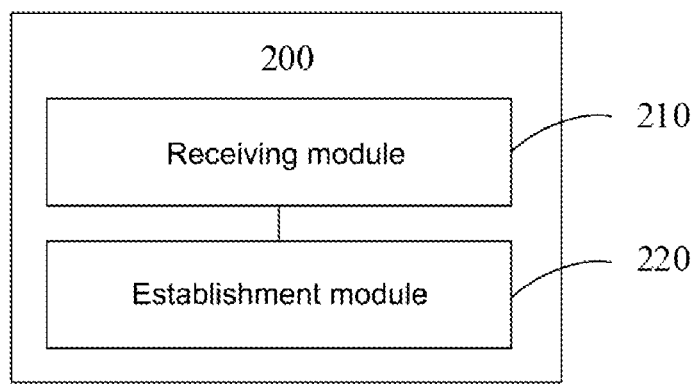
FIG. 15 is a schematic diagram of a functional module of another time synchronization apparatus provided by an embodiment of the present disclosure.

FIG. 15 is a schematic diagram of a functional module of another time synchronization apparatus provided by an embodiment of the present disclosure. The basic principle and technical effects of the device are the same as those of the corresponding method embodiment mentioned above. For brief description, for those not mentioned in this embodiment, please refer to the corresponding contents in the method embodiment. As shown in FIG. 15, the time synchronization apparatus 200 may include:

a receiving module 210, which is used by a user plane function UPF to receive a target forwarding rule sent by a SMF according to target virtual dedicated link information, wherein the target virtual dedicated link information includes first interface information, second interface information and target PDU session information; and an establishment module 220, which is used by the UPF to establish a target PDU session with a terminal according to the target forwarding rule, so as to transmit a time synchronization message through the target PDU session and the interface indicated by the target virtual dedicated link information.

The implementation principle and technical effect of the above apparatus configured to perform the method provided by the aforementioned embodiments are similar, and will not be repeated here.

The above modules may be one or more integrated circuits configured to implement the above method, such as one or more application specific integrated circuits (ASIC), one or more digital signal processors (DSP), or one or more field programmable gate arrays (FPGA), etc. For example, when one of the above modules is implemented in the form of calling program codes by a processing element, the processing element may be a general-purpose processor, such as a central processing unit (CPU) or other processors that can call the program codes. For another example, these modules may be integrated together and implemented in the form of system-on-a-chip (SOC).

Figure 16:
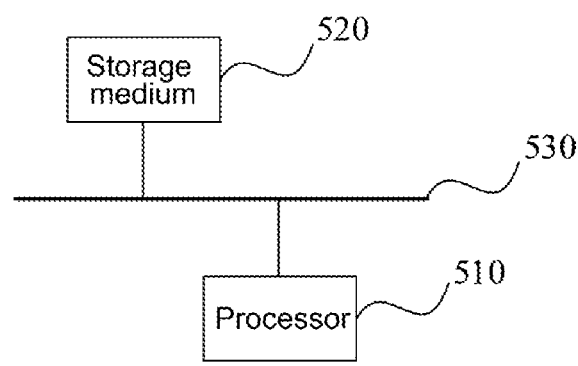
FIG. 16 is a structural schematic diagram of an electronic device provided by an embodiment of the present disclosure.

FIG. 16 is a structural schematic diagram of an electronic device provided by an embodiment of the present disclosure. The electronic device may be integrated into a terminal device or a chip provided by the terminal, and the terminal may be a computing device with image processing function. As shown in FIG. 16, the electronic device may include a processor 510, a storage medium 520 and a bus 530. The storage medium 520 stores machine-readable instructions executable by the processor 510. When the electronic device is running, the processor 510 communicates with the storage medium 520 through the bus 530, and the processor 510 executes the machine-readable instructions to perform the steps of the above method embodiment. The specific implementations and technical effects are similar, and will not be repeated here.

Optionally, the present disclosure further provides a storage medium, on which a computer program is stored, and when the computer program is run by a processor, the steps of the above method embodiment are executed. The specific implementations and technical effects are similar, and will not be repeated here.

From the several embodiments provided by the present disclosure, it is to be understood that the disclosed apparatuses and methods may be implemented in other ways. The above-described apparatus embodiments are only schematic. For example, the division of the units is only a logical function division, and there may be another division mode in actual implementation. For example, a plurality of units or components may be combined or integrated into another system, or some features may be ignored or not performed. On the other hand, the shown or discussed mutual coupling or direct coupling or communication connection may be an indirect coupling or a communication connection through some interfaces, apparatuses or units, which may be in electrical, mechanical or in other forms.

In addition, each functional unit in each embodiment of the present disclosure may be integrated in one processing unit, or each functional unit may physically exist separately, or two or more units may be integrated in one unit. The above-mentioned integrated units may be implemented in the form of hardware or hardware plus a software functional unit.

The integrated unit implemented in the form of the above-mentioned software functional unit may be stored in a computer-readable storage medium. The above-mentioned software functional unit may be stored in a storage medium, and may include several instructions to make a computer device (which may be a personal computer, a server, or a network device, etc.) or a processor execute some steps of the methods described in various embodiments of the present disclosure. The aforementioned storage media include: U disk, mobile hard disk, read-only memory (ROM), random access memory (RAM), magnetic disk or CD-ROM, and other media that can store program codes.

What is claimed is:

1. A time synchronization method, comprising:
sending, by a terminal, a target protocol data unit PDU session establishment request to a session management function SMF according to a routing policy, wherein the target PDU session establishment request comprises a target virtual dedicated link identifier, the target virtual dedicated link identifier is configured to indicate for the SMF to request a policy control function PCF to acquire corresponding target virtual dedicated link information, and determine a target user plane function UPF and generate a target forwarding rule according to the target virtual dedicated link information, the target virtual dedicated link information comprises first interface information, second interface information and target PDU session information, wherein a first interface indicated by the first interface information is connected to a first clock node to be synchronized, and a second interface indicated by the second interface information is connected to a second clock node to be synchronized; and
establishing, by the terminal, a target PDU session with the target user plane function UPF to transmit a time synchronization message by the target PDU session and the first interface and the second interface indicated by the target virtual dedicated link information, wherein the target PDU session is a PDU session established by the target UPF according to the target forwarding rule, and the target forwarding rule is sent to the target UPF by the SMF according to the target virtual dedicated link information.

2. The method according to claim 1, wherein before the sending, by a terminal, a target protocol data unit PDU session establishment request to a session management function SMF according to a routing policy, the method further comprises:
sending, by the terminal, a registration request to an access and mobility management function AMF, wherein the registration request comprises an identifier of the terminal, and the registration request is configured to request the AMF to send a control policy request to the policy control function PCF; and
receiving, by the terminal, a reply message sent by the AMF according to the registration request, wherein the reply message comprises the routing policy corresponding to the terminal, and the routing policy comprises the target virtual dedicated link identifier configured to indicate a target virtual dedicated link corresponding to the terminal, the target virtual dedicated link is configured to transmit the time synchronization message, and the target virtual dedicated link corresponding to the terminal is determined by the PCF according to the identifier of the terminal.

3. The method according to claim 2, wherein the routing policy further comprises at least one interface information and time synchronization message identification information; and the sending, by a terminal, a target protocol data unit PDU session establishment request to a SMF according to a routing policy comprises:

sending, after the terminal receives data through a terminal-side interface, the target protocol data unit PDU session establishment request to the SMF according to the routing policy based on the interface information and the time synchronization message identification information.

4. The method according to claim 1, wherein the target forwarding rule is that a UPF forwards a time synchronization message, received from a PDU session by the first interface, from the second interface, and forwards a time synchronization message received by the second interface to the first interface through the PDU session; or the UPF forwards a time synchronization message, received by the first interface from the PDU session, from a PDU session corresponding to the second interface to the second interface, and forwards a time synchronization message received by the second interface to the first interface through a PDU session corresponding to the first interface.

5. A time synchronization method, comprising:

receiving, by a policy control function PCF, a target virtual dedicated link acquisition request sent by a session management function SMF according to a target PDU session establishment request, wherein the target virtual dedicated link acquisition request comprises a target virtual dedicated link identifier;

acquiring, by the PCF, target virtual dedicated link information corresponding to a terminal according to the target virtual dedicated link identifier, wherein the target virtual dedicated link information comprises first interface information, second interface information and target PDU session information, a first interface indicated by the first interface information is connected to a first clock node to be synchronized, and a second interface indicated by the second interface information is connected to a second clock node to be synchronized; and sending, by the PCF, the target virtual dedicated link information to the SMF, such that the SMF sends a target forwarding rule to a user plane function UPF according to the target virtual dedicated link information, and establishing, by the UPF, a target PDU session with the terminal according to the target forwarding rule, so as to transmit a time synchronization message through the target PDU session and the first interface and the second interface indicated by the target virtual dedicated link information.

6. The method according to claim 5, wherein before the receiving, by a policy control function PCF, a target virtual dedicated link acquisition request sent by a session management function SMF according to a target PDU session establishment request, the method further comprises:

receiving, by the PCF, a control policy request sent by an access and mobility management function AMF according to a registration request of the terminal, wherein the control policy request comprises an identifier of the terminal;

generating, by the PCF, a routing policy corresponding to the terminal according to the control policy request; and sending, by the PCF, a routing policy to the AMF to be forwarded to the terminal by the AMF.

7. The method according to claim 5, wherein before the receiving, by a policy control function PCF, a target virtual dedicated link acquisition request sent by a session management function SMF according to a target PDU session establishment request, the method further comprises:

sending, by the PCF, a virtual dedicated link subscription request to a unified data management UDM; and receiving, by the PCF, a subscription event notification replied by the UDM according to the virtual dedicated link subscription request, wherein the subscription event notification comprises virtual dedicated link information, and the virtual dedicated link information comprises interface information and session information, wherein the virtual dedicated link information is created by a network exposure function NEF in response to a request of an application function AF, and then acquired and sent to the UDM.

8. A time synchronization method, comprising:

receiving, by a user plane function UPF, a target forwarding rule sent by a SMF according to target virtual dedicated link information, wherein the target virtual dedicated link information comprises first interface information, second interface information and target PDU session information, a first interface indicated by the first interface information is connected to a first clock node to be synchronized, and a second interface indicated by the second interface information is connected to a second clock node to be synchronized; and establishing, by the UPF, a target PDU session with a terminal according to the target forwarding rule, so as to transmit a time synchronization message by the target PDU session and the first interface and the second interface indicated by the target virtual dedicated link information.

9. The method according to claim 6, wherein before the receiving, by a policy control function PCF, a target virtual dedicated link acquisition request sent by a session management function SMF according to a target PDU session establishment request, the method further comprises:

sending, by the PCF, a virtual dedicated link subscription request to a unified data management UDM; and receiving, by the PCF, a subscription event notification replied by the UDM according to the virtual dedicated link subscription request, wherein the subscription event notification comprises virtual dedicated link information, and the virtual dedicated link information comprises interface information and session information, wherein the virtual dedicated link information is created by a network exposure function NEF in response to a request of an application function AF, and then acquired and sent to the UDM.

* * * * *